US007877637B2

(12) United States Patent
Shibata et al.

(10) Patent No.: US 7,877,637 B2
(45) Date of Patent: Jan. 25, 2011

(54) MULTICORE ABNORMALITY MONITORING DEVICE

(75) Inventors: Kenji Shibata, Nagoya (JP); Hiroyuki Ihara, Anjo (JP)

(73) Assignee: Denso Corporation, Kariya (JP)

( * ) Notice: Subject to any disclaimer, the term of this patent is extended or adjusted under 35 U.S.C. 154(b) by 416 days.

(21) Appl. No.: 12/165,964

(22) Filed: Jul. 1, 2008

(65) Prior Publication Data

US 2009/0013217 A1  Jan. 8, 2009

(30) Foreign Application Priority Data

Jul. 4, 2007  (JP) ............................. 2007-176544

(51) Int. Cl.
*G06F 11/00* (2006.01)
(52) U.S. Cl. .......................................... 714/31; 700/79
(58) Field of Classification Search ...................... None
See application file for complete search history.

(56) References Cited

U.S. PATENT DOCUMENTS

| | | | | | |
|---|---|---|---|---|---|
| 3,950,729 | A | * | 4/1976 | Fletcher et al. ................ 714/31 |
| 4,710,926 | A | * | 12/1987 | Brown et al. .................... 714/4 |
| 5,524,206 | A | | 6/1996 | Saito |
| 6,045,199 | A | * | 4/2000 | Toyoda ........................ 303/159 |
| 7,496,788 | B1 | * | 2/2009 | Alfieri et al. ................... 714/21 |
| 2004/0230865 | A1 | * | 11/2004 | Balazich et al. ................ 714/13 |
| 2005/0022054 | A1 | * | 1/2005 | Rasmussen et al. ........... 714/10 |
| 2005/0022073 | A1 | | 1/2005 | Urashima |
| 2006/0248409 | A1 | | 11/2006 | Baumann et al. |
| 2010/0162042 | A1 | * | 6/2010 | Inoue et al. ................... 714/11 |

FOREIGN PATENT DOCUMENTS

| | | |
|---|---|---|
| JP | 63-085860 | 4/1988 |
| JP | 07-200503 | 8/1995 |
| JP | 10-091603 | 4/1998 |
| JP | 2005-512218 | 4/2005 |

OTHER PUBLICATIONS

Extended European Search Report dated Mar. 22, 2010, issued in corresponding European Application No. 08011025.7-1225.

* cited by examiner

*Primary Examiner*—Gabriel L Chu
(74) *Attorney, Agent, or Firm*—Nixon & Vanderhye PC

(57) ABSTRACT

A monitoring side core has an input protection part including an access checking part and an address information storage part. Address information of a count RAM area and an access prohibiting mode to the address are stored in the address information storage part in advance by CPU. The access checking part determines whether an address to be accessed through a first communication path by a monitored side core and an access mode are coincident with the stored address and the stored access prohibiting mode. When the coincidence is determined, the access of the monitored side core to the count RAM area of the monitoring side core is prohibited.

6 Claims, 5 Drawing Sheets

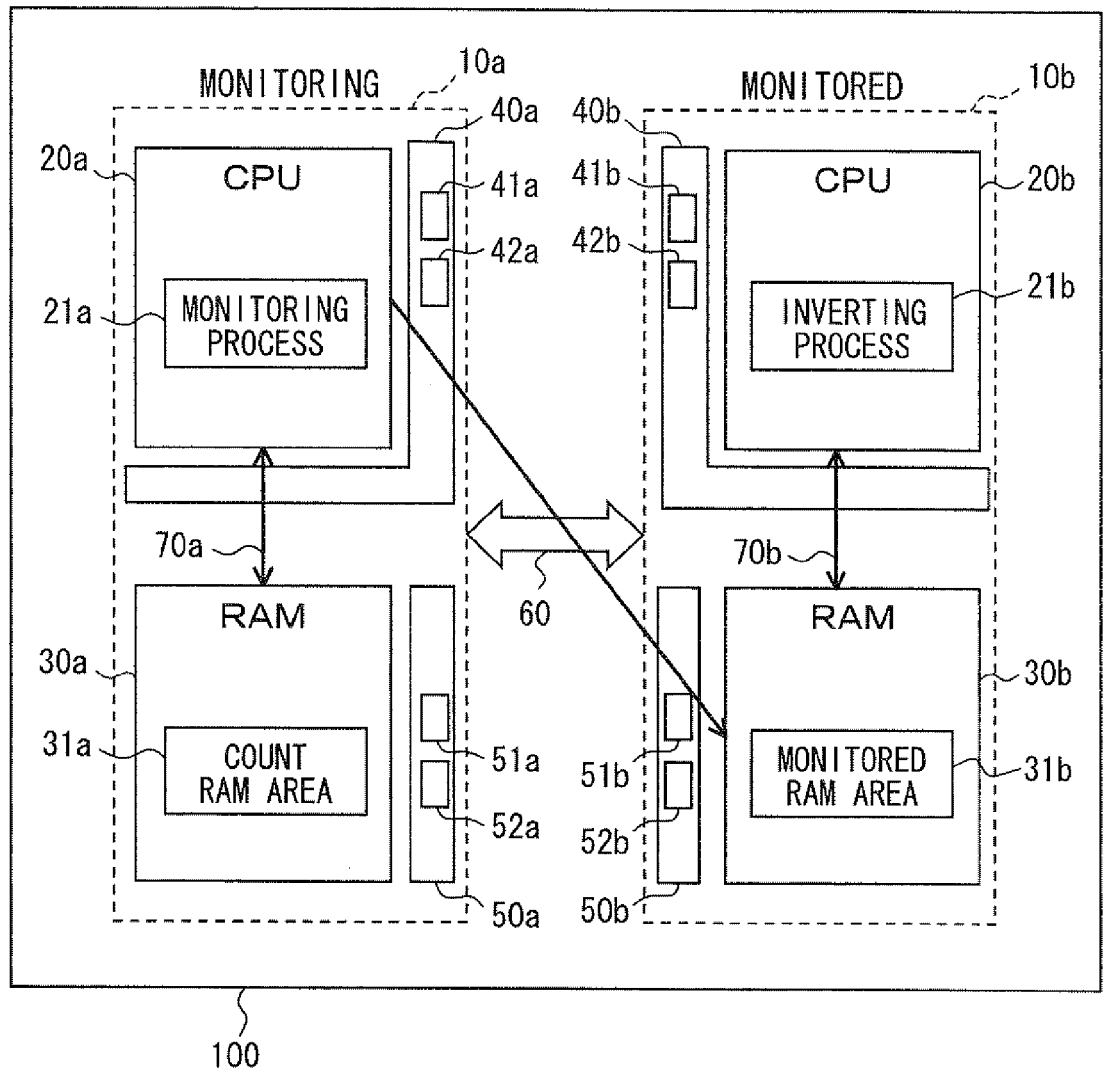
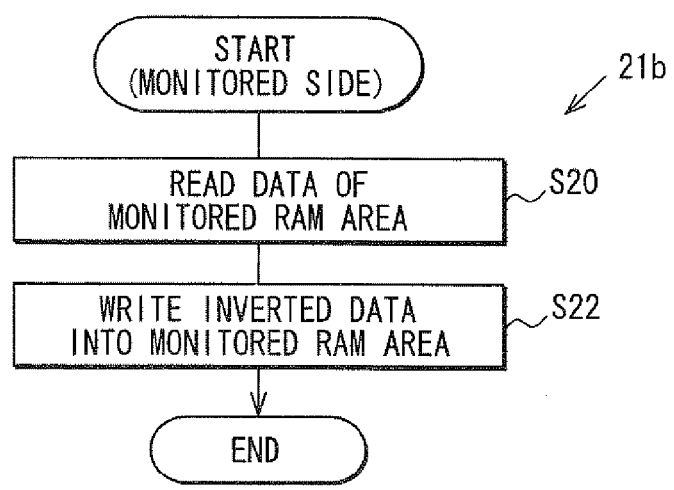

MULTICORE ABNORMALITY MONITORING DEVICE

CROSS REFERENCE TO RELATED APPLICATION

This application is based on and incorporates herein by reference Japanese Patent Application No. 2007-176544 filed on Jul. 4, 2007.

FIELD OF THE INVENTION

The present invention relates to a multicore abnormality monitoring device, in which multiple processor cores are integrated in one package.

BACKGROUND OF THE INVENTION

It is general in a microprocessor (CPU) that only one processor core is provided in one package to operate as one part while being combined with a command issuing section, an operating section, etc. For example, various kinds of control for a vehicle or the like are executed by using multiprocessor-configured electronic control unit (ECU) using plural CPUs. In the multiprocessor-configured ECU, plural CPUs forming the ECU are allocated to a monitor source (monitoring side: hereinafter referred to as "main side") or a monitor target (monitored side: hereinafter referred to as "sub side"), and CPU at the main side (main-side CPU) monitors the operation state of the CPU at the sub side (sub-side CPU).

Specifically, the sub-side CPU inverts a predetermined port output value every predetermined time, and the main-side CPU monitors the predetermined port output. Here, when it occurs continuously at a predetermined number of times that the predetermined port output value is not inverted or it becomes a different value, the main-side CPU determines that the operation state of the sub-side CPU is abnormal. If the operation state of the sub-side CPU is determined to be abnormal, the main-side CPU replaces a value calculated by the sub-side CPU with a predetermined default value or the like, thereby executing a fail-safe operation.

When such a general technique is directly applied to multicore-configured ECU, the following problem arises. That is, in the multicore-configured ECU, a resource such as RAM, a register or the like which is common to plural processor cores forming the ECU is provided in one package, so that each processor core can access this common resource. Therefore, when the operation state of each sub-side core is abnormal, the sub-side core may access the area of the common RAM which is used by the main-side core to count the above predetermined number of times, so that the content of the common RAM is rewritten. If the content of the common RAM is rewritten as described above, the main-side core cannot accurately identify the operation state of the sub-side core because the main-side core determines the operation state of the sub-side core on the basis of the content stored and held in the common RAM. Furthermore, it is difficult to properly execute the fail-safe operation.

Therefore, according to JP 7-200503A, a writing-prohibiting area designating part is provided between each processor core and common RAM. When a processor core is about to write information into an area other than the dedicated area of the processor core, the writing is invalidated through the writing-prohibiting area designating part.

In the above technique, the area used by each processor core in the common RAM can be dedicated. Accordingly, for example, even when the operation state of the sub-side core is abnormal, the situation that the content stored and held in the area dedicated to the main-side core in the common RAM which is used by the main-side core is rewritten by the sub-side core hardly occurs.

However, when the abnormal operation state of the sub-side core is more serious, it may be considered that the sub-side core rewrites the writing-prohibiting area stored in the writing-prohibiting area designating part, and exclude the dedicated area of the main-side core in the common RAM used by the main-side core from the designation as the writing prohibiting area. In this case, the content stored in the dedicated area of the main-side core may be rewritten by the sub-side core. Therefore, the main-side core cannot accurately determine the operation state of the sub-side core. Further it is difficult for the main-side core to properly execute the fail-safe operation.

SUMMARY OF THE INVENTION

The present invention has therefore has an object to provide a multicore abnormality monitoring device that can accurately determine the operation state of each core.

According to one aspect of the present invention, a multicore abnormality monitoring device is configured with plural processor cores and a first communication path, which connects the plural processor cores to one another and is integrated with the plural processor cores in one package. Each of the plural processor cores includes an arithmetic processing part, a temporary storage part mainly used by the arithmetic processing part, and a second communication path connecting the arithmetic processing part and the temporary storage part so that the arithmetic processing part accesses the temporary storage part. At least two processor cores of the plural processor cores are respectively formed as a monitoring side core and a monitored side core. The monitoring side core is configured to monitor an operation state of the monitored side core. In the monitored side core, the arithmetic processing part is configured to access the temporary storage part through the second communication path to execute a first writing operation every predetermined time. In the monitoring side core, the arithmetic processing part is configured to access the temporary storage part through the second communication path to execute a second writing operation corresponding to a result of the first writing operation in the monitored side core every predetermined time while monitoring the result of the first writing operation in the monitored side core through the first communication path, and determine that the operation state of the monitored side core is abnormal when a predetermined determination condition based on the result of the second writing operation is satisfied.

The monitoring side core further includes a protection part configured with an access checking part and an address information storage part. The address information storage part is configured to store, in advance through the arithmetic processing section of the monitoring side core, address information of the temporary storage part of the monitoring side core and an access prohibiting mode to the address concerned. The access checking part is configured to check whether an address and an access made through the first communication path by the arithmetic processing part of the monitored side core and an access mode thereof are coincident with the address and the access prohibiting mode stored in the address information storage part. The protection part is configured to prohibit an access to the temporary storage part of the monitoring side core by the monitored side core when coincidence of address is determined through the access checking part.

BRIEF DESCRIPTION OF THE DRAWINGS

The above and other objects, features and advantages of the present invention will become more apparent from the following detailed description made with reference to the accompanying drawings. In the drawings:

FIG. 1 is a schematic diagram showing a multicore abnormality monitoring device according to a first embodiment of the present invention;

FIG. 2 is a flowchart showing a processing procedure of monitoring target processing executed in the first embodiment;

DETAILED DESCRIPTION OF THE PREFERRED EMBODIMENTS

First Embodiment

Figure 3:
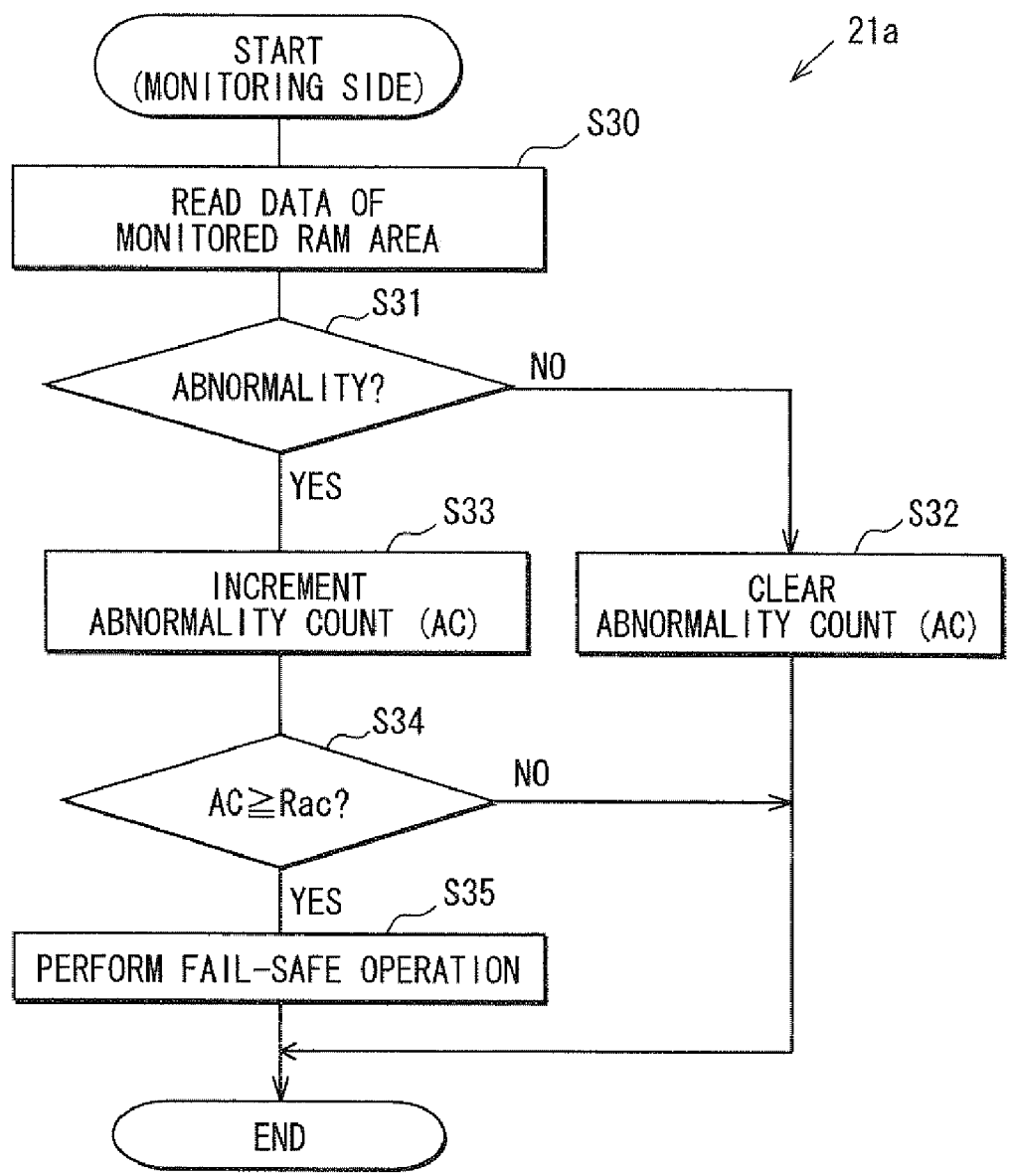
FIG. 3 is a flowchart showing a processing procedure of abnormality monitoring determining processing executed in the first embodiment.

Referring first to FIG. 1, a multicore abnormality monitoring device is configured as a dual-core abnormality monitoring device 1, which is used as a fuel injection control device for injecting and supplying fuel into an engine of a vehicle, for example. The monitoring device 1 includes basically a monitoring side core 10a, a monitored side core 10b, and a first communication path 60. The monitoring side core 10a is for monitoring the operation state of the monitored side core 10b. The communication path 60 (for example, bus or the like) connects the cores 10a and 10b to each other so that information required to execute various kinds of processing and various kinds of control described later can be transmitted/received. These elements are accommodated in one package 100. The package 100 has two processor cores, and for convenience of description, the processor core located at the left side of the figure is allocated as the monitoring side core, and the processor core located at the right side of the figure is allocated as the monitored side core. However, the roles of these processor cores may be exchanged by each other, and they may serve to mutually monitor each other.

Here, the monitoring side core 10a basically has, as an arithmetic processing section, CPU 20a for executing abnormality monitoring determination processing described later, RAM 30a which is mainly used by CPU 20a, and a second communication path 70a for connecting CPU 20a and RAM 30a so that CPU 20a can access RAM 30a. Likewise, the monitored side core 10b basically has, as an arithmetic processing section, CPU 20b for executing monitored side processing described later, RAM 30b which is mainly used by CPU 20b, and a second communication path 70b for connecting CPU 20b and RAM 30b so that CPU 20b can access RAM 30b.

RAM 30a is provided and mainly used by the monitoring side core 10a. However, it is also used by the monitored side core 10b through the first communication path 60. Likewise, RAM 30 is provided and mainly used by the monitored side core 10b. However, it is also used by the monitoring side core 10a through the first communication path 60.

The monitoring side core 10a and the monitored side core 10b cannot necessarily use (write and read) all the areas of RAMs 30a and 30b. As shown in the figure, a RAM area 31a for counting (i.e., count RAM area 31a) is set in RAM 30a by a program (software). On this RAM area 31a, only the monitoring core 10a can perform writing and reading through the second communication path 70a. The monitored side core 10b cannot perform any of writing and reading even through the first communication path 60. Likewise, a monitored RAM area 31b is set in RAM 30b by a program (software). On this RAM area 31b, only the monitored side core 10b can perform writing and reading through the second communication path 70b. The monitoring side core 10a can perform only reading through the first communication path 60.

More specifically, the monitored RAM area 31b is used by the monitoring side core 10a as follows.

As shown in FIG. 2, CPU 20b first reads a data (e.g., numerical value) temporarily stored in the monitored RAM area 31b through the second communication path 70b as the processing of step S20, and writes an inverted data of the read data into the monitored RAM area 31b through the second communication path 70b as the subsequent processing of step S22. The series of processing (steps S20 and S22) are executed every predetermined time. In this embodiment, for example, hexadecimal number "$55" (accordingly, the inverted data thereof is hexadecimal number "$AA") is used as an initial data which is temporarily stored in the monitored RAM area 31b. Therefore, when the operation state of CPU 20b is normal, the monitored side processing is normally executed, and the hexadecimal numbers "$55" and "$AA" are inverted and temporarily stored in the monitored RAM area 31b every predetermined time. As described later, CPU 20a reads the data temporarily stored in the monitored side RAM 31b to check the data and determine the operation state of CPU 20b on the basis of the read data.

The RAM area 31a for count is used by the monitoring side core 10a (CPU 20a) as follows.

As shown in FIG. 3, CPU 20a first reads a data temporarily stored in the monitored RAM area 31b through the first communication path 60 as the processing of step S30, and checks whether the read data is abnormal or not as the subsequent determination processing of step S31. That is, CPU 20a checks whether the read data is inverted between the above predetermined data and the inverted data every predetermined time. Here, in the determination processing of the previous step S31, if the read data is inverted between the predetermined data and the inverted data every predetermined time (the determination processing of step S31 is "NO"), it means that the monitored side processing (FIG. 2) by CPU 20b is correctly executed. Therefore, CPU 20a determines that the operation state of CPU 20b is normal, As the processing of subsequent step S32, CPU 20a clears the abnormality frequency count value AC temporarily stored in the count RAM area 31a to zero through the second communication path 70a and temporarily finishes the abnormality monitoring determination processing.

In the check processing of the previous step S31, when the read data is not inverted every predetermined time or if the read data is equal to a data other than the predetermined data and the inverted data thereof (the determination processing of step S31 is "Yes"), it means that the monitored side processing (FIG. 2) by CPU 20b is not correctly executed. Therefore, CPU 20a determines that the operation state of CPU 20b is abnormal with high probability. As the processing of subsequent step S33, CPU 20a increments the abnormality frequency count value AC temporarily stored in the count RAM area 31a through the second communication path 70a.

As the determination processing of subsequent step S34, CPU 20a checks whether the abnormality frequency count value AC reaches a reference determination value Rac. Here, if the abnormality frequency count value AC does not reach the determination value Rac ("NO" in the determination processing of step S34), the operation state of CPU 20b may be normally restored. Accordingly, CPU 20a temporarily finishes the abnormality monitoring determination processing without immediately determining that the operation state of CPU 20b is abnormal. However, if the abnormality frequency count value AC reaches the determination value Rac ("YES" in the determination processing of step S34), the probability that the operation state of CPU 20b is normally restored is very low. Therefore, CPU 20a determines that the operation state of CPU 20b is abnormal, and executes fail-safe operation processing as described later as the processing of subsequent step S35. The monitoring side core 10a (CPU 20a) executes the series of abnormality monitoring determination processing (steps S30 to S35) described above every predetermined time.

However, even when the execution programs of CPUs 20a and 20b are programmed so that the RAMs 30a and 30b are used in the above manner, or even when these programs are correct, CPU 20b may actually access the count RAM area 31a through the first communication path 60 and rewrite the data temporarily stored in the count RAM area 31a due to noises or when the operation state of CPU 20b as the monitored side is abnormal. If the data temporarily stored in the count RAM area 31a are rewritten as described above, CPU 20a cannot accurately determine the operation state of CPU 20b because the CPU 20a determines the operation state of CPU 20b on the basis of the data temporarily stored in the count RAM area 31a, and further it is difficult for CPU 20a to properly execute the fail-safe processing (the processing of the previous step S35) described later.

Therefore, as shown in FIG. 1, the monitored side core 10b is provided with an output protection part (second protection means) 40b at the connection portion between the first communication path 60 and CPU 20b and the connection portion between the second communication path 70b and CPU 20b. The monitoring side core 10a is also provided with an output protection part 40a at the connection portion between the first communication path 60 and CPU 20a and the connection portion between the second communication path 70a and CPU 20a. Thus, CPU 20b cannot access RAM 30a (particularly, the count RAM area 31a) or RAM 30b (particularly, the monitored RAM area 31b) unless the access is performed through the output protection part 40b. Similarly, CPU 20a cannot access RAM 30a (particularly, the count RAM area 31a) or RAM 30b (particularly, the monitored RAM area 31b) unless the access is performed through the output protection part 40a. According to the embodiment, as described below, by interposing the output protection parts 40a and 40b, the count RAM area 31a and the monitored RAM area 31b are allowed to be used by CPUs 20a and 20b through the output protection parts even when the operation state of CPU 20b is abnormal.

The output protection parts 40a and 40b will be described in detail. The output protection part 40a is constructed by a small-scale microcomputer, for example, and has an access checking part 41a and an address information storage part 42a. Likewise, the output protection part 40b is constructed by a small-scale microcomputer, and has an access checking part 41b and an address information storage part 42b.

Figure 4A:
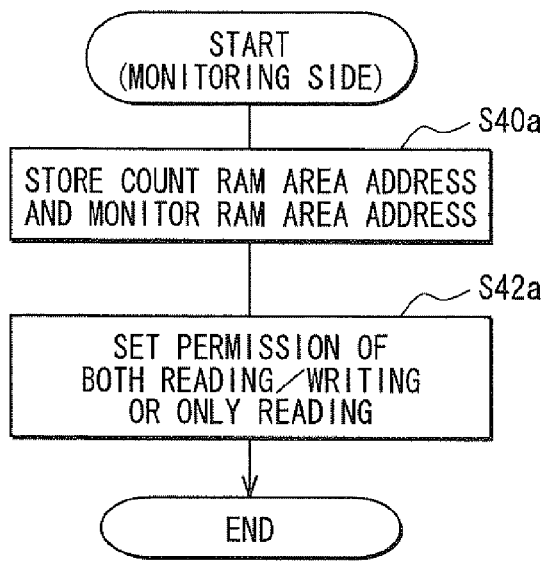
FIGS. 4A and 4B are flowcharts showing processing procedures of output initial setting executed in the first embodiment.

CPU 20a executes initial setting processing of the output protection part 40a shown in FIG. 4A before the abnormality monitoring determination processing shown in FIG. 3 is executed. CPU 20a first stores the addresses of the count RAM area 31a and the monitored RAM area 31b into the address information storage part 42a as the processing of the step S40a. Next, as the processing of step S42a, CPU 20a sets "permit both reading and writing (reading/writing)" or "permit only reading" with respect to each of the addresses which have been stored as described above. Likewise, CPU 20b executes initial setting processing of the output protection part 40b shown in FIG. 4B before the monitored side processing shown in FIG. 2 is executed. As the processing of step S40b, CPU 20b first stores the addresses of the count RAM area 31a and the monitored side RAM area 31b into the address information storage part 42b. Subsequently, as the processing of step S42b, CPU 20b sets "prohibit any access" or "permit both reading/writing" with respect to each of the addresses which have been stored.

Here, the access prohibiting mode to the count RAM area 31a and the monitored side RAM area 31b by CPU 20a and 20b is described in detail.

When the operation state of CPU 20b is determined by CPU 20a, it is not required for CPU 20b to perform reading and writing on the count RAM area 31a through the first communication path 60. Furthermore, when the operation state of CPU 20b is determined by CPU 20a, it is required for CPU 20b to write the predetermined data and the inverted data into the monitored RAM area 31b.

Therefore, when an access to RAM 30a or 30b is required from CPU 20b to the output protection part 40b, the access checking part 41b checks whether the address of the request destination is coincident with the address of the count RAM area 31a or the monitored RAM area 31b (which is temporarily stored in the address information storage part 42b). Here, when the address of the request destination is not coincident with the above address, the access checking part 41b permits the access request by CPU 20b.

On the other hand, when the address of the request destination is coincident with the above address, the access checking part 41b further checks whether the access request of CPU 20b is a reading request or writing request. When the access request of CPU 20b is a reading request to the count RAM area 31a or a writing request to the count RAM 31a, the access checking part 41b interrupts all of these access requests. Furthermore, when the access request of CPU 20b is a reading request to the monitored RAM area 31b or a writing request to the monitored RAM area 31b, the access checking part 41b accepts all of these requests.

As described above, CPU 20b cannot access the count RAM area 31a, and thus CPU 20b can neither read temporarily stored data nor write the data. Accordingly, in the dual-core abnormality monitoring device 1, the monitored side core 10b has the output protection part 40b, and thus the data temporarily stored in the count RAM area 31a are hardly broken down.

CPU 20a is required to read the monitored RAM area 31b in order to make a determination as to the operation state of CPU 20b. Furthermore, when the operation state of CPU 20b is determined by CPU 20a, CPU 20a is required to write the abnormality frequency count value into the count RAM area 31a.

Therefore, when an access to RAM 30a or 30b is requested from CPU 20a to the output protection part 40a, the access checking part 41*a* first determines whether the address of the request destination is coincident with the address of the count RAM area 31*a* or the monitored RAM area 31*b* (which is temporarily stored in the address information storage part 42*a*). Here, if the address of the request destination is not coincident with the above address, the access checking part 41*a* permits the access request by CPU 20*a*.

When the address of the request destination is coincident with the above address, the access checking part 41*a* further checks whether the access request of CPU 20*a* is a reading request or a writing request. If the access request of CPU 20*a* is a reading request to the count RAM area 31*a* or a writing request to the count RAM area 31*a*, the access checking part 41*a* accepts all of these requests. Furthermore, if the access request of CPU 20*a* is a reading request to the monitored RAM area 31*b*, the access checking part 41*a* accepts this request. However, if the access request of CPU 20*a* is a writing request to the monitored RAM area 31*b*, the access checking part 41*a* interrupts this request.

As described above, CPU 20*a* is allowed to access the monitored RAM area 31*b* to read the temporarily stored data, however, it cannot rewrite the data. Accordingly, in the dual-core abnormality monitoring device 1, the data temporarily stored in the monitored RAM area 31*b* are hardly broken down because the monitoring side core 10*a* has the output protection part 40*a*.

Figure 4B:
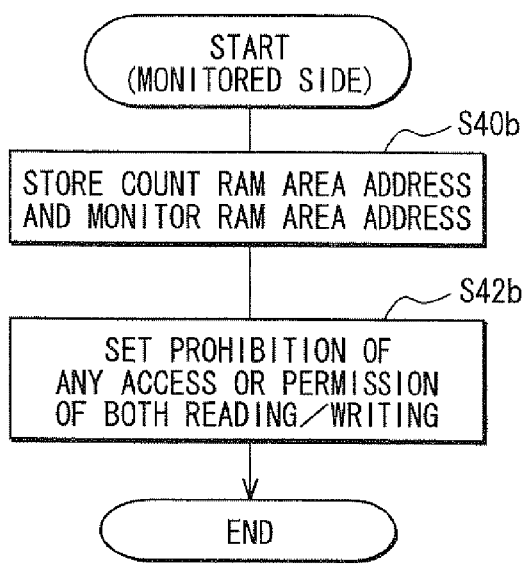

As shown in FIG. 4B, CPU 20*b* stores the addresses of the count RAM area 31*a* and the monitored RAM area 31*b* in the address information storage part 42*b*, and also sets "prohibit all of accesses" or "permit both of reading and writing" with respect to such addresses.

Therefore, when the abnormal operation state of CPU 20*b* is critical, for example, CPU 20*b* may release the protection function of the output protection part 40*b*. Specifically, in the initial setting processing of the output protection part 40*b* (see FIG. 4B), CPU 20*b* may store addresses different from the addresses of the count RAM area 31*a* and the monitored RAM area 31*b* into the address information storage part 42*b* or set a permission mode different from the above access permission mode. Furthermore, even when a writing request to the count RAM area 31*a* which should not be originally output is output from CPU 20*b* to the output protection part 40*b* (abnormal access), the output protection part 40*b* cannot prohibit or interrupt the abnormal access, and thus the data temporarily stored in the count RAM area 31*a* may be rewritten by CPU 20*b*, that is, broken down. In addition, CPU 20*a* cannot accurately determine the operation state of CPU 20*b*. Further it is difficult for CPU 20*a* to properly execute the fail-safe processing described later.

Therefore, according to this embodiment, as shown in FIG. 1, the monitoring side core 10*a* is provided with an input protection part (first protection means) 50*a* at the connection portion between the first communication path 60 and RAM 30*a*, and the monitored side core 10*b* is provided with an input protection part 50*b* at the connection portion between the first communication path 60 and RAM 30*b*. That is, CPU 20*b* cannot access RAM 30*a* (particularly, the count RAM area 31*a*) unless the access is performed through not only the output protection part 40*b*, but also the input protection part 50*a*. Likewise, CPU 20*a* cannot access RAM 30*b* (particularly, the monitored RAM area 31*b*) unless the access is performed through not only the output protection part 40*a*, but also the input protection part 50*b*. As described above, by interposing the input protection parts 50*a* and 50*b*, the count RAM area 31*a* and the monitored RAM area 31*b* are made to be surely used by CPUs 20*a* and 20*b* in the mode described above.

The input protection parts 50*a* and 50*b* described above will be described in detail below. As shown in FIG. 1, the input protection part 50*a* is constructed by a small-scale microcomputer, and has an access checking part 51*a* and an address information storage part 52*a*. Likewise, the input protection part 50*b* is constructed by a small-scale microcomputer, and has an access checking part 51*b* and an address information storage part 52*b*.

Figure 5A:
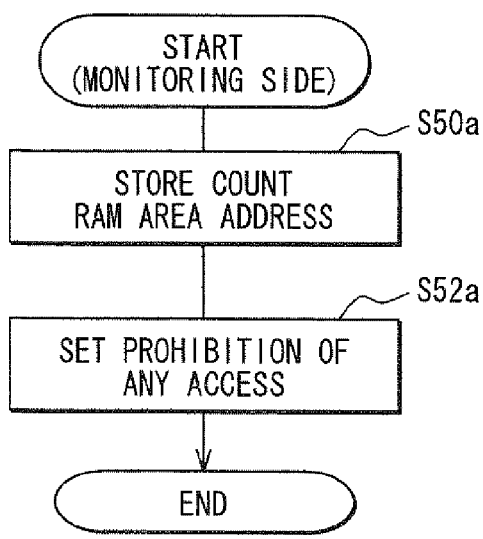
FIGS. 5A and 5B are flowcharts showing processing procedures of input initial setting executed in the first embodiment.
Figure 5B:
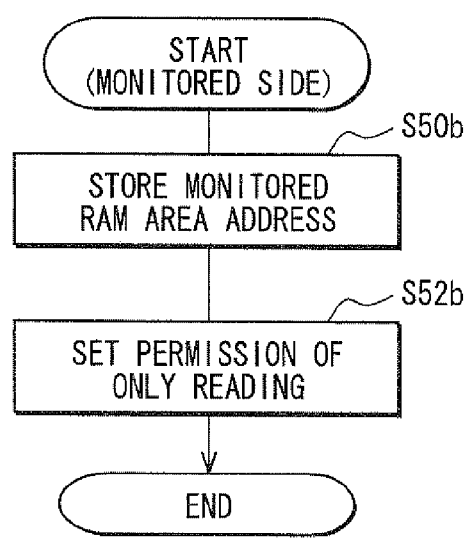

Before the abnormality monitoring determination processing shown in FIG. 3 is executed, CPU 20*a* also executes the initial setting processing of the input protection part 50*a* shown in FIG. 5A in addition to the initial setting processing of the output protection part 40*a* shown in FIG. 4A. CPU 20*a* first stores the address of the count RAM area 31*a* in the address information storage part 52*a* as the processing of step S50*a*. Subsequently, as the processing of step S52*a*, CPU 20*a* sets "prohibit any access" with respect to the stored addresses as described above. Likewise, before the monitored side processing shown in FIG. 2 is executed, CPU 20*b* executes the initial setting processing of the input protection part 50*b* shown in FIG. 5B in addition to the initial setting processing of the output protection part 40*b* shown in FIG. 4B. CPU 20*b* first stores the address of the monitored RAM area 31*b* in the address information storage part 52*b* as the processing of step S50*b*. Subsequently, as the processing of step S52*b*, CPU 20*b* sets "permit only reading" with respect to the stored addresses as described above.

Here, adoption of the access permission mode to the count RAM area 31*a* by CPU 20*a* and the access permission mode to the monitored RAM area 31*b* by CPU 20*b* are described in detail.

As described above, when the operation state of CPU 20*b* is determined by CPU 20*a*, it is unnecessary for CPU 20*b* to perform reading or writing on the count RAM area 31*a*. Therefore, when an access to RAM 30*a* (particularly the count RAM area 31*a*) is required from CPU 20*b* to the input protection part 50*a* while breaking through the protection function of the output protection part 40*b*, the access checking part 51*a* checks whether the address of the request destination (which is temporarily stored in the address information storage part 52*a*) is coincident with the address of the count RAM area 31*a*. Here, when the address of the request destination is not coincident with the above address, the access checking part 51*a* permits the access request of CPU 20*b*. On the other hand, when the address of the request destination is coincident with the above address, the access checking part 51*a* interrupts all accesses irrespective of whether the access request of CPU 20*b* is a reading request or a writing request.

As described above, even when the operation abnormality state of CPU 20*b* is critical and an access to the count RAM area 31*a* is made by breaking through the protection function of the output protection part 40*b* (abnormal access), this abnormal access is prohibited by the input protection part 50*a*, so that the data temporarily stored in the count RAM area 31*a* can be neither read nor rewritten. Accordingly, in the dual-core abnormality monitoring device 1, the data which are temporarily stored in the count RAM area 31*a* are protected from being broken down because the monitoring side core 10*a* has the input protection part 50*a*.

Furthermore, in order to determine the operation state of CPU 20*b*, CPU 20*a* is required to read the monitored RAM area 31*b*. Therefore, when an access from CPU 20*a* to RAM 30*b* (particularly, monitored RAM area 31*b*) is requested to the input protection part 50*b* while (normally) passing through the protection function of the output protection part 40*a*, the access checking part 51*b* determines whether the address of the request destination is coincident with the address of the monitored RAM area 31b (which is temporarily stored in the address information storage part 52a). Here, if the address of the request destination is not coincident with the above address, the access checking part 51b permits the access request of CPU 20a.

On the other hand, when the address of the request destination is coincident with the above address, the access checking part 51b further checks whether the access request of CPU 20a is a reading request or a writing request. If the access request of CPU 20a is a reading request to the monitored RAM area 31b, the access checking part 51b accepts this request. However, if the access request of CPU 20a is a writing request to the monitored RAM area 31b, the access checking part 51b interrupts this request.

As described above, CPU 20a can access the monitored RAM area 31b and read temporarily stored data. However, CPU 20a cannot rewrite the data. Accordingly, in the dual-core abnormality monitoring device 1, the data which are temporarily stored in the monitored RAM area 31b are hardly broken down because the monitoring side core 10a has the output protection part 40a.

The input protection part 50a is not possessed by the same monitored side core 10b as CPU 20b, but it is possessed by the same monitoring side core 10a as CPU 20a whose operation state is normal. Therefore, even when the abnormal operation state of CPU 20b is critical, CPU 20b cannot release the protection function of the input protection part 50a. Specifically, the protection function of the input protection part 50a is established on the basis of the address information temporarily stored in the address information storage part 52a and the access permission mode which targets the address concerned. Only CPU 20a can execute the initial setting processing of this input protection part 50a, and CPU 20b cannot execute the initial setting processing on program and physically. Therefore, even when the abnormal operation state of CPU 20b is critical, the protection function of the input protection part 50a cannot be released. Accordingly, even when CPU 20b can break through the protection function of the output protection part 40b, CPU 20b cannot break through the protection function of the input protection part 50a, access the count RAM area 31a, and read/write temporarily stored data.

An example of the operation of the dual-core abnormality monitoring device 1 will be described with reference to FIG. 6.

Figure 6:
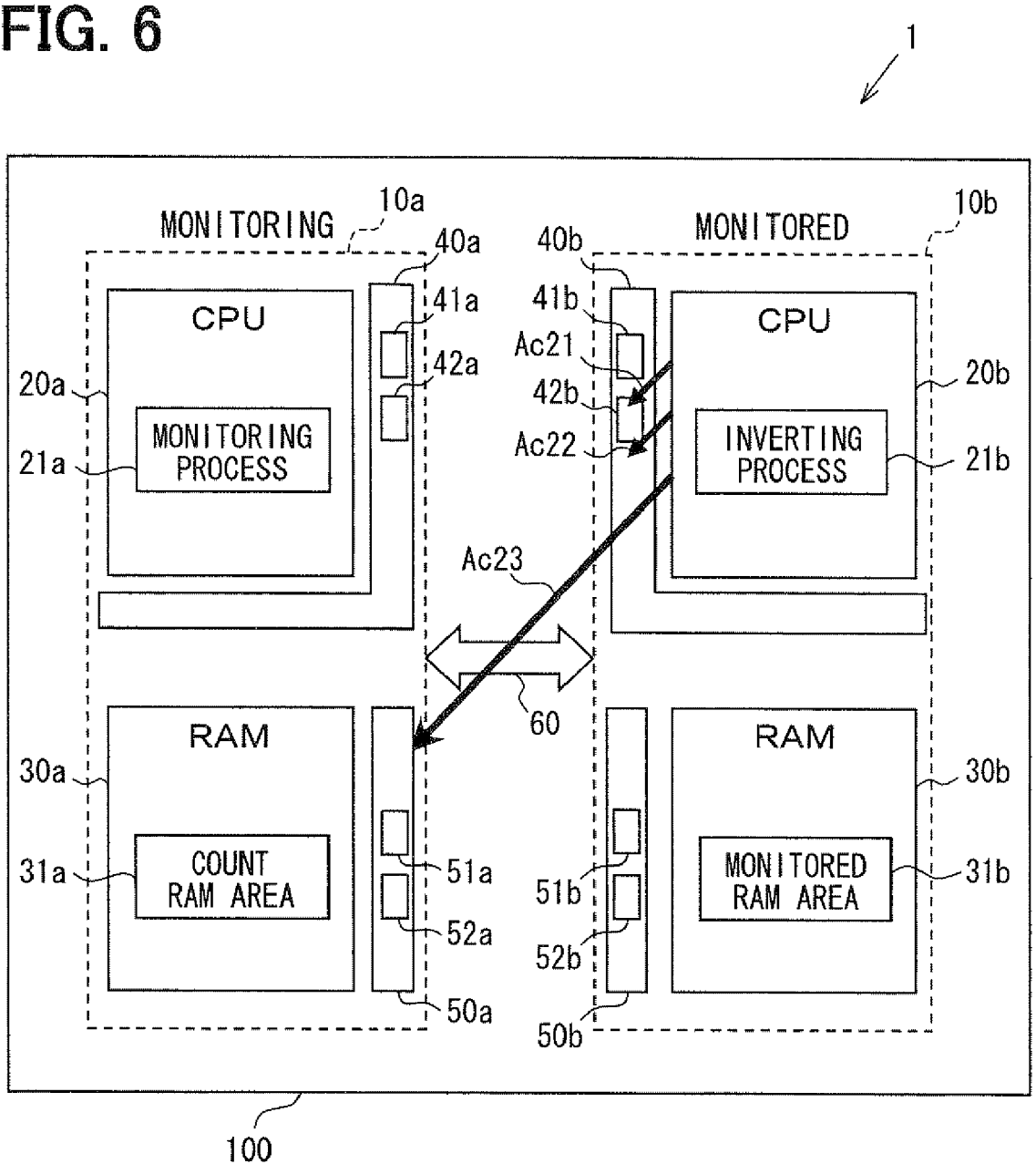
FIG. 6 is a schematic diagram showing an operation of the first embodiment.

When the operation state of the monitored side core 10b (CPU 20b) is abnormal, CPU 20b makes an abnormal access to the count RAM area 31a as indicated as abnormal accesses Ac21 and Ac22 by arrows in FIG. 6. However, when the abnormal operation state of CPU 20b is not so critical and the protection function of the output protection part 40b is not released, the abnormal accesses Ac21 and Ac22 cannot break through the output protection part 40b even when CPU 20b makes an abnormal access to the count RAM area 31a. Accordingly, data which are temporarily stored in the count RAM area 31a are protected.

When the abnormal operation state of the monitored side core 10b (accurately, CPU 20b) is critical, CPU 20b makes an abnormal access to the count RAM area 31a as indicated as an abnormal access Ac23 by an arrow in FIG. 6. At this time, The abnormal operation state of CPU 20b is critical and the protection function of the output protection part 40b is released, so that the abnormal access Ac23 breaks through the protection function of the output protection part 40b. However, even when the abnormal operation of CPU 20b is critical, the protection function of the input protection part 50a which is not possessed by the same monitoring side core 10a cannot be released, so that the abnormal access Ac23 is prohibited by the input protection part 50a. Accordingly, data which are temporarily stored in the count RAM area 31a are protected.

As described above, the data which are temporarily stored in the count RAM area 31a are protected by the output protection part 40b and the input protection part 50a, and thus CPU 20a can accurately determine the operation state of CPU 20b.

Furthermore, the dual-core abnormal monitoring device 1 as descried above is applied to a fuel injection control device (ECU) for injecting and supplying fuel into the combustion chamber of a vehicle, for example.

In the driving control of a vehicle, even when the operation states of some of plural processor cores forming ECU are abnormal, the vehicle must perform at least a limp-home travel as a fail-safe operation. Therefore, the fuel injection control is executed as described below, for example.

When the operation states of the plural processor cores forming ECU are normal, a basic fuel injection amount corresponding to an amount at which the driving of the vehicle can be continued is calculated on the basis of an air amount, etc. which are taken into the combustion chamber of the engine, and a correction coefficient is calculated on the basis of parameters such as a engine cooling water temperature detected by a water temperature sensor, etc., for example. The basic fuel injection amount is corrected to a final fuel injection amount on the basis of the correction coefficient. The fuel of the final fuel injection amount is injected and supplied to the combustion chamber through the driving control of an injector.

On the other hand, when the operation states of some of the plural processor cores forming ECU are abnormal, as the fail safe, the correction coefficient calculated on the basis of the above parameter is not used, but the correction coefficient is replaced by a predetermined default value and the basic fuel injection amount is corrected to the final fuel injection amount by using the default value. The fuel of the final fuel injection amount is injected and supplied to the combustion chamber through the driving control of the injector.

In this embodiment, the monitoring side core 10a (CPU 20a) executes basic fuel injection amount calculating processing (basic control value calculation processing) for calculating the basic fuel injection amount (basic control value), first correction processing for correcting the basic fuel injection amount to the final fuel injection amount (final control value) by using a predetermined default value as the correction coefficient, and the fuel injection and supply of the final injection amount of fuel through the driving control of the injector. Furthermore, the monitored side core 10b (CPU 20b) executes second correction processing of correcting the basic fuel injection amount to the final fuel injection amount by using the correction coefficient calculated on the basis of sensor output values of various kinds of sensors.

Accordingly, when CPU 20a determines that the operation state of CPU 20b is abnormal, the fuel injection device injects and supplies the fuel of the final fuel injection amount calculated by correcting the basic fuel injection amount with the predetermined default value as the correction coefficient to the combustion chamber through the driving control of the injector as the fail-safe operation, whereby the limp-home travel of the vehicle having the fuel injection device mounted therein can be surely executed.

Second Embodiment

Figure 7:
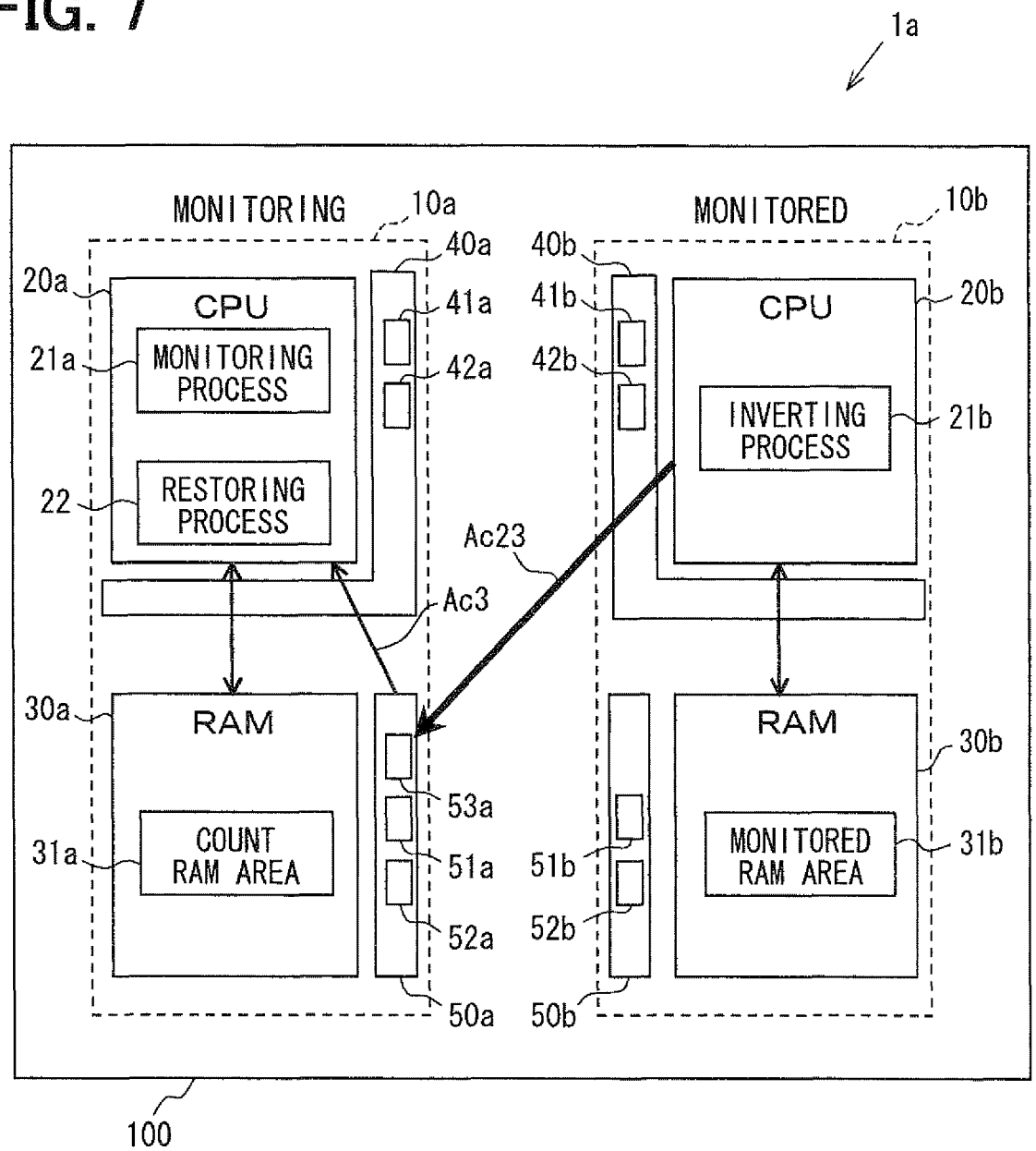
FIG. 7 is a schematic diagram showing a multicore abnormality monitoring device according to a second embodiment of the present invention.

In a second embodiment, as shown in FIG. 7, a dual-core abnormality monitoring device 1a is constructed similarly to that in the first embodiment.

However, the input protection part 50a is equipped with a reporting part 53a for reporting information associated with an abnormal access Ac23 from CPU 20b to CPU 20a, when the input protection part 50a interrupts the abnormal access Ac23 of CPU 20b, and CPU 20a determines the degree of the abnormal operation state of CPU 20b on the basis of the information reported by the reporting part 53a and executes restoration processing of CPU 20b in accordance with the degree of the abnormal operation state.

Specifically, as indicated as the abnormal access Ac23, when CPU 20b breaks through the protection function of the output protection part 40b and makes an abnormal access to the count RAM area 31a, the input protection part 50a (access checking part 51a) interrupts this abnormal access Ac23 as described above. Further, the access checking part 51a obtains information associated with the occurrence condition of the abnormal access Ac23 such as information as to which processor core tries to make an access to which area in RAM 30a, etc., and transmits the obtained information to the reporting part 53a. The reporting part 53a reports the transmitted information to CPU 20a as indicated by a report Ac3 in FIG. 7.

CPU 20a receiving the report of the information as described above determines the degree of the abnormal operation state of CPU 20b such as "instantaneous malfunction occurs in the output protection part 40b," "the operation state of CPU 20b is abnormal," "the abnormal operation state of CPU 20b is critical, and abnormal access to the count RAM area 31a is issued excessively" or the like on the basis of the information associated with the occurrence condition of the abnormal access Ac23 as indicated as the restoration processing 22 in FIG. 7. Furthermore, as the restoration processing 22, CPU 20a executes the restoration processing such as "resetting of the output protection part 40b," "reset of CPU 20b," "reset of the whole device concerned" or the like in accordance with the determined degree of the abnormal operation state of CPU 20b.

According to the dual-core abnormality monitoring device 1a, the determination is made as to whether the operation state of CPU 20b is abnormal or normal, but also the degree of the abnormal operation state of CPU 20b can be determined and the restoration processing corresponding to the degree concerned can be executed. Furthermore, it can be prevented in advance that the whole of the device is reset although the abnormal operation state of CPU 20b is not so critical and only CPU 20b may be merely reset. Therefore, the device can be more efficiently operated.

In the second embodiment, the input protection part 50a has the reporting function (that is, the reporting part 53a is a constituent element of the input protection part 50a) in addition to the protection function described above. However, for example, the reporting part 53a may be separated from the constituent element of the input protection part 50a, and the monitoring side core 10a may be provided with the reporting part 53a separately from the input protection part 50a.

Other Embodiments

The multicore abnormality monitoring device according to the present invention is not limited to the constructions of the first and second embodiments. Various modifications may be made without departing from the subject of the present invention. That is, the following variations may be implemented by properly modifying the above embodiments.

In each of the above embodiments, as the monitored side processing (see FIG. 2), CPU 20b reads the data temporarily stored in the monitored RAM area 31b through the second communication path 70b, and the inverted data of the thus-read data is written through the second communication path 70b. However, for example, CPU 20b may read the data temporarily stored in the monitored RAM area 31b through the second communication path 70b, and write the integration data of the sum of the read data and a predetermined number through the second communication path 70b (count up). That is, any operation may be adopted insofar as the operation state of CPU 20b is correctly reflected to the operation when CPU 20a monitors the operation state of CPU 20b.

In each of the above embodiments, the monitored RAM area 31b in which the operation result of CPU 20b as described above is temporarily stored is possessed by the monitored side core 10b. However, the monitoring side core 10a may possess the monitored RAM area 31b, that is, the monitored RAM area 31b may be set in RAM 30a. In this case, a direct memory access (DMA) system in which CPU 20b accesses the monitored side RAM area set in RAM 30a while CPU 20a does not intervene may be adopted. That is, the monitored RAM area 31b may be located at any place insofar as the operation result of CPU 20b can be monitored by CPU 20a.

In each of the above embodiments, as the abnormality monitoring determination processing (see FIG. 3), the operation state of CPU 20b is determined on the basis of the data temporarily stored in the monitored RAM area 31b, and the operation state of CPU 20b is determined as being abnormal when the abnormality frequency count value AC corresponding to the frequency at which the operation state is determined as being abnormal reaches the predetermined reference determination value Rac. The determination value Rac may be set to any value. For example, if the operation state is once determined as being abnormal, the operation state of CPU 20b is immediately finally determined as being abnormal (that is, the determination value is set to "1").

In each of the above embodiments, the dual-core abnormality monitoring devices 1 and 1a are provided with both of the output protection parts 40a and 40b and the input protection parts 50a and 50b. However, the output protection parts 40a and 40b may be omitted.

In each of the above embodiments, the dual-core abnormality monitoring devices 1 and 1a are applied to the fuel injection control device for injecting and supplying the fuel to the engine of a vehicle, and the fuel injection and supply of the final fuel injection amount is executed by the monitoring side core 10a through the basic fuel injection amount calculation processing, the first correcting processing and the driving control of the injector, and the second correcting processing is executed by the monitored side core 10b. However, the multicore abnormality monitoring device may be applied to a controller for calculating a final control value for controlling any control target, the monitoring side core is made to execute basic control value calculation processing for calculating a basic control value for maintaining the control of the control target on the basis of sensor output values of various kinds of sensors possessed by the control target and first correction processing for correcting the basic control value calculated through the basic control value calculation processing to a final control value on the basis of a predetermined default value, and the monitored side core is made to execute second correction processing for correcting the basic control value calculated through the basic control value calculation processing to the final control value on the basis of the sensor output values. Accordingly, the device can control the control target on the basis of the final control value corrected through the first correction processing as fail-safe operation when the monitoring side core determines that the operation state of the monitored side core is abnormal.

Each of the above embodiments is constructed by a dual-core in which two processor cores are integrated in one package. However, the number of processor cores may be set to any value. As the number of the processor cores increases, the effect of the protection function of the output protection part and the input protection part is enhanced. That is, the chain process that when the operation state of one processor core becomes abnormal, the operation state of some processor core further becomes abnormal due to the abnormality of the one processor core and the operation states of the other processor cores successively become abnormal with the abnormality of the above processor core as a trigger can be suppressed from occurring.

What is claimed is:

1. A multicore abnormality monitoring device comprising:
    plural processor cores; and
    a first communication path connecting the plural processor cores to one another and integrated with the plural processor cores in one package,
    wherein each of the plural processor cores includes an arithmetic processing part, a temporary storage part mainly used by the arithmetic processing part, and a second communication path connecting the arithmetic processing part and the temporary storage part so that the arithmetic processing part accesses the temporary storage part,
    wherein at least two processor cores of the plural processor cores are respectively formed as a monitoring side core and a monitored side core, the monitoring side core being configured to monitor an operation state of the monitored side core,
    wherein, in the monitored side core, the arithmetic processing part is configured to access the temporary storage part through the second communication path to execute a first writing operation every predetermined time, and
    wherein, in the monitoring side core, the arithmetic processing part is configured to access the temporary storage part through the second communication path to execute a second writing operation corresponding to a result of the first writing operation in the monitored side core every predetermined time while monitoring the result of the first writing operation in the monitored side core through the first communication path, and determine that the operation state of the monitored side core is abnormal when a predetermined determination condition based on the result of the second writing operation is satisfied,
characterized in that
    the monitoring side core further includes a first protection part configured with an access checking part and an address information storage part,
    wherein the address information storage part is configured to store, in advance through the arithmetic processing section of the monitoring side core, address information of the temporary storage part of the monitoring side core and an access prohibiting mode to the address concerned,
    wherein the access checking part is configured to check whether an address and an access made through the first communication path by the arithmetic processing part of the monitored side core and an access mode thereof are coincident with the address and the access prohibiting mode stored in the address information storage part, and
    wherein the first protection part is configured to prohibit an access to the temporary storage part of the monitoring side core by the monitored side core when coincidence of address is determined through the access checking part.

2. The multicore abnormality monitoring device of claim 1,
    wherein the monitored side core further includes a second protection part configured with an access checking part and an address information storage part,
    wherein the address information storage part is configured to store, in advance through the arithmetic processing section of the monitored side core, address information of the temporary storage part of the monitoring side core and access prohibiting mode to the address concerned,
    wherein the access checking part is configured to check whether an address and an access made through the first communication path by the arithmetic processing part of the monitored side core and an access mode thereof are coincident with the address and the access prohibiting mode stored in the address information storage part, and
    wherein the second protection part is configured to prohibit an access to the temporary storage part of the monitoring side core by the monitored side core when coincidence of address is determined through the access checking part.

3. The multicore abnormality monitoring device of claim 1,
    wherein the first protection part further includes a reporting part for reporting to the arithmetic processing unit of the monitoring side core information associated with the operation state of the monitored side core which makes an access to the temporary storage part of the monitoring side core under operation, and
    the monitoring side core is configured to determine degree of abnormality of the operation state of the monitored side core on the basis of the information reported by the reporting part, and execute restoration processing of the monitored side core in accordance with the degree of the abnormality.

4. The multicore abnormality monitoring device of claim 1,
    wherein the first writing operation is an operation in which the arithmetic processing unit of the monitored side core alternately writes each of a predetermined data and an inverted data thereof into the temporary storage part of the monitored side core every predetermined time.

5. The multicore abnormality monitoring device of claim 1,
    wherein the second writing operation is an operation in which the arithmetic processing unit of the monitoring side core writes, into the temporary storage part of the monitoring side core, a frequency at which the first writing operation continuously fails to be correctly executed.

6. The multicore abnormality monitoring device of claim 1,
    wherein the arithmetic processing unit of the monitoring side core is configured to calculate a final control value to control a control target, by executing basic control value calculation processing for calculating a basic control value for enabling the control of the control target to be maintained on the basis of sensor output values of various kinds of sensors provided on the control target, and first correcting processing for correcting the basic control value calculated by the basic control value calculation processing to the final control value on the basis of a predetermined default value,
    wherein the arithmetic processing unit of the monitored side core is configured to execute second correction processing for correcting the basic control value calculated through the basic control value calculation processing to the final control value on the basis of the sensor output values, wherein the control target is controlled on the basis of the final control value corrected through the second correction processing when the operation state of the monitored side core is determined as being normal, and on the basis of the final control value corrected through the first correction processing as a fail-safe operation when the operation state of the monitored side core is determined as being abnormal.

* * * * *